US012045398B2

United States Patent
Aiyar et al.

(10) Patent No.: US 12,045,398 B2
(45) Date of Patent: Jul. 23, 2024

(54) APPLICATION SELECTOR FOR POINT-OF-SALE DEVICES

(71) Applicant: VeriFone, Inc., Wilmington, DE (US)

(72) Inventors: Bhanu Raghuraman Aiyar, Chennai (IN); Rajesh Brahmankar, Tampa, FL (US); Kathir Prabhakaran Shanmugam, Bengaluru (IN); Kesavan M, Chennai (IN); Pankaj Raman Mohapatra, Balasore (IN); Vadirajachar P G, Chitradurga (IN); Winston Leong, Roseville, CA (US); Pradeep Moka, Bangalore (IN); Harshananda R S, Bangalore (IN); Venkatesh Channa, SPSR Nellore (IN)

(73) Assignee: VeriFone, Inc., Wilmington, DE (US)

( * ) Notice: Subject to any disclaimer, the term of this patent is extended or adjusted under 35 U.S.C. 154(b) by 0 days.

(21) Appl. No.: 17/935,706

(22) Filed: Sep. 27, 2022

(65) Prior Publication Data
US 2023/0107351 A1    Apr. 6, 2023

(30) Foreign Application Priority Data
Oct. 1, 2021    (IN) .............................. 202111044654

(51) Int. Cl.
G06F 3/0346    (2013.01)
G01P 15/18    (2013.01)
(Continued)

(52) U.S. Cl.
CPC ............ *G06F 3/0346* (2013.01); *G01P 15/18* (2013.01); *G06F 3/0481* (2013.01); *G07G 1/0009* (2013.01)

(58) Field of Classification Search
None
See application file for complete search history.

(56) References Cited

U.S. PATENT DOCUMENTS

| 9,129,274 B1 * | 9/2015 | Mocko ............... F16M 11/2014 |
| 2008/0048980 A1 * | 2/2008 | Love .................... G06F 3/0346 345/158 |

(Continued)

*Primary Examiner* — Amare Mengistu
*Assistant Examiner* — Sarvesh J Nadkarni
(74) *Attorney, Agent, or Firm* — Bond, Schoeneck & King, PLLC

(57) ABSTRACT

A point-of-sale device including an adjustable screen, an accelerometer, and a processor is provided. The adjustable screen is arranged in a cashier position or a customer position. The accelerometer generates orientation data corresponding to the adjustable screen. The processor determines, via an accelerometer driver, an adjustable screen position based on the orientation data. The processor then generates, via the accelerometer driver, a position change notification if the adjustable screen changes position. The processor then provides the position change notification and the adjustable screen position to an application selector. The processor then launches, via the application selector upon receiving the position change notification, an application based on the adjustable screen position. In one example, the launched application is a point-of-sale application if the adjustable screen position is the cashier position. In another example, the launched application is a self-checkout application if the adjustable screen position is the customer position.

20 Claims, 14 Drawing Sheets

(51) Int. Cl.
*G06F 3/0481* (2022.01)
*G07G 1/00* (2006.01)

(56) References Cited

U.S. PATENT DOCUMENTS

| | | | |
|---|---|---|---|
| 2015/0186986 A1* | 7/2015 | Voege | G06F 3/017 |
| | | | 345/156 |
| 2015/0199882 A1* | 7/2015 | Fernando | G07G 1/0018 |
| | | | 345/173 |
| 2015/0261314 A1* | 9/2015 | Herring | G06F 1/1626 |
| | | | 345/156 |
| 2016/0019628 A1* | 1/2016 | Udumudi | G06Q 30/0633 |
| | | | 705/26.1 |
| 2016/0051067 A1* | 2/2016 | Law | F16M 11/2021 |
| | | | 361/679.22 |
| 2019/0179422 A1* | 6/2019 | Beatty | G07G 1/01 |
| 2021/0064140 A1* | 3/2021 | Egan | G06Q 20/204 |

* cited by examiner

Fig. 6

APPLICATION SELECTOR FOR POINT-OF-SALE DEVICES

CROSS-REFERENCE TO RELATED APPLICATIONS

This application claims priority to Indian Patent Application No. 202111044654, filed Oct. 1, 2021, and entitled "Application Selector for Point-of-Sale Devices", the entirety of which is incorporated herein by reference.

FIELD OF THE DISCLOSURE

The present disclosure is directed generally to systems, devices, and methods for selecting and launching applications on point-of-sale devices based on screen position.

BACKGROUND

Self-checkout technology allows retail shops to design a checkout area with both point-of-sale devices (operated by cashiers) and self-checkout terminals (operated by customers). For instance, a retail shop may decide to implement four self-checkout terminals and two attended point-of-sale devices within the checkout area. While this design may work well during the majority of business hours, it may not be ideal under all conditions. For example, during especially slow periods, the shop may only utilize a single cashier, resulting in the second attended point-of-sale device going unused. Similarly, during especially busy periods, the retail shop may wish to employ more than two cashiers to speed up the checkout process, but is limited by the attended two point-of-sale devices. Unused self-checkout terminals or attended point-of-sale devices can take up valuable space in a retail shop. As checkout volume can change quickly, there is a need in the art for a configurable device capable of quickly switching between a point-of-sale application and a self-checkout application to optimize customer throughput and usage of the checkout area.

SUMMARY OF THE DISCLOSURE

The present application is directed to a configurable point-of-sale device. The point-of-sale device includes an adjustable screen, an accelerometer, and a processor. The accelerometer provides the processor with orientation data regarding the adjustable screen. The processor analyzes the orientation data to determine the position and/or orientation of the adjustable screen, and if the position and/or orientation has changed. If the position and/or orientation has changed, the processor launches an application, such as a point-of-sale application or a self-checkout application, based on the position of the adjustable screen, the orientation of the adjustable screen, and/or one or more additional factors. Thus, a cashier may quickly and easily configure the point-of-sale device to run a point-of-sale application or self-checkout application by simply moving the adjustable screen.

Generally, in one aspect, a point-of-sale device is provided. The point-of-sale device includes an adjustable screen. The adjustable screen is configured to be arranged in a cashier position or a customer position.

The point-of-sale device further includes an accelerometer. The accelerometer is configured to generate orientation data. The orientation data corresponds to the adjustable screen.

The point-of-sale device further includes a processor. The processor is configured to receive, via the accelerometer, the orientation data.

The processor is further configured to determine, via an accelerometer driver, an adjustable screen position based on the orientation data.

The processor is further configured to generate, via the accelerometer driver, a position change notification if the adjustable screen changes position.

The processor is further configured to provide the position change notification and the adjustable screen position to an application selector.

The processor is further configured to launch, via the application selector upon receiving the position change notification, an application based on the adjustable screen position. The application is a point-of-sale application or a self-checkout application. In one example, the launched application is a point-of-sale application if the adjustable screen position is the cashier position. In another example, the launched application is a self-checkout application if the adjustable screen position is the customer position.

According to an example, the processor is further configured to determine an idle status of the point-of-sale device. The launch of the application may be further based on the idle status.

According to an example, the processor is further configured to display, via the adjustable screen, an application selection window. The application selection window is configured to receive an application selection input if the adjustable screen position is the cashier position. The launch of the application may be further based on the application selection input. The application selection window may include a selectable point-of-sale button and a selectable self-checkout button.

According to an example, the processor may be further configured to determine an adjustable screen orientation based on the orientation data. The adjustable screen orientation may be landscape or portrait. The processor may be further configured to arrange the launched application based on the adjustable screen orientation.

According to an example, the processor is further configured to display a transition screen prior to launching the application. The transition screen may be displayed for a delay period. The transition screen may include a selectable cancel button. The selectable cancel button may be configured to cancel the launch of the application upon selection. The transition screen may include a selectable application launch button. The selectable application launch button may be configured to launch the application upon selection.

Generally, in another aspect, a method for configuring a point-of-sale device is provided. The point-of-sale device includes an adjustable screen. The adjustable screen is configured to be arranged in a cashier position or a customer position.

The method includes generating, via an accelerometer, orientation data corresponding to an adjustable screen of the point-of-sale device.

The method includes determining, via an accelerometer driver, an adjustable screen position based on the orientation data.

The method includes generating, via the accelerometer driver, a position change notification if the adjustable screen changes position.

The method includes providing the position change notification and the adjustable screen position to an application selector.

The method includes launching, via the application selector upon receiving the position change notification, an application based on the adjustable screen position, wherein the application is a point-of-sale application or a self-checkout application.

According to an example, the method includes determining an idle status of the point-of-sale device. The launch of the application is further based on the idle status.

According to an example, the method further includes displaying, via the adjustable screen, an application selection window configured to receive an application selection input if the adjustable screen position is the cashier position. The launch of the application is further based on the application selection input.

According to an example, the method further includes determining, via the accelerometer driver, an adjustable screen orientation based on the orientation data. The orientation of the adjustable screen is landscape or portrait. The method further includes arranging, via the application selector, the launched application based on the adjustable screen orientation.

Generally, in another aspect, a point-of-sale device is provided. The point-of-sale device includes an adjustable screen. The adjustable screen is configured to be arranged in landscape orientation or portrait orientation.

The point-of-sale device further includes an accelerometer. The accelerometer is configured to generate orientation data. The orientation data corresponds to the adjustable screen.

The point-of-sale device further includes a processor. The processor is configured to receive, via the accelerometer, the orientation data.

The processor is further configured to determine, via an accelerometer driver, an adjustable screen orientation based on the orientation data.

The processor is further configured to generate, via the accelerometer driver, an orientation change notification if the adjustable screen changes orientation.

The processor is further configured to provide the orientation change notification and the adjustable screen orientation to an application selector.

The processor is further configured to launch, via the application selector upon receiving the orientation change notification, an application based on the adjustable screen orientation. The application is a point-of-sale application or a self-checkout application.

In various implementations, a processor or controller may be associated with one or more storage media (generically referred to herein as "memory," e.g., volatile and non-volatile computer memory such as RAM, PROM, EPROM, EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects as discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

FIG. 6 is an illustration of a point-of-sale application as displayed on an adjustable screen of a point-of-sale device, in accordance with an example.

DETAILED DESCRIPTION OF EMBODIMENTS

Figure 1:
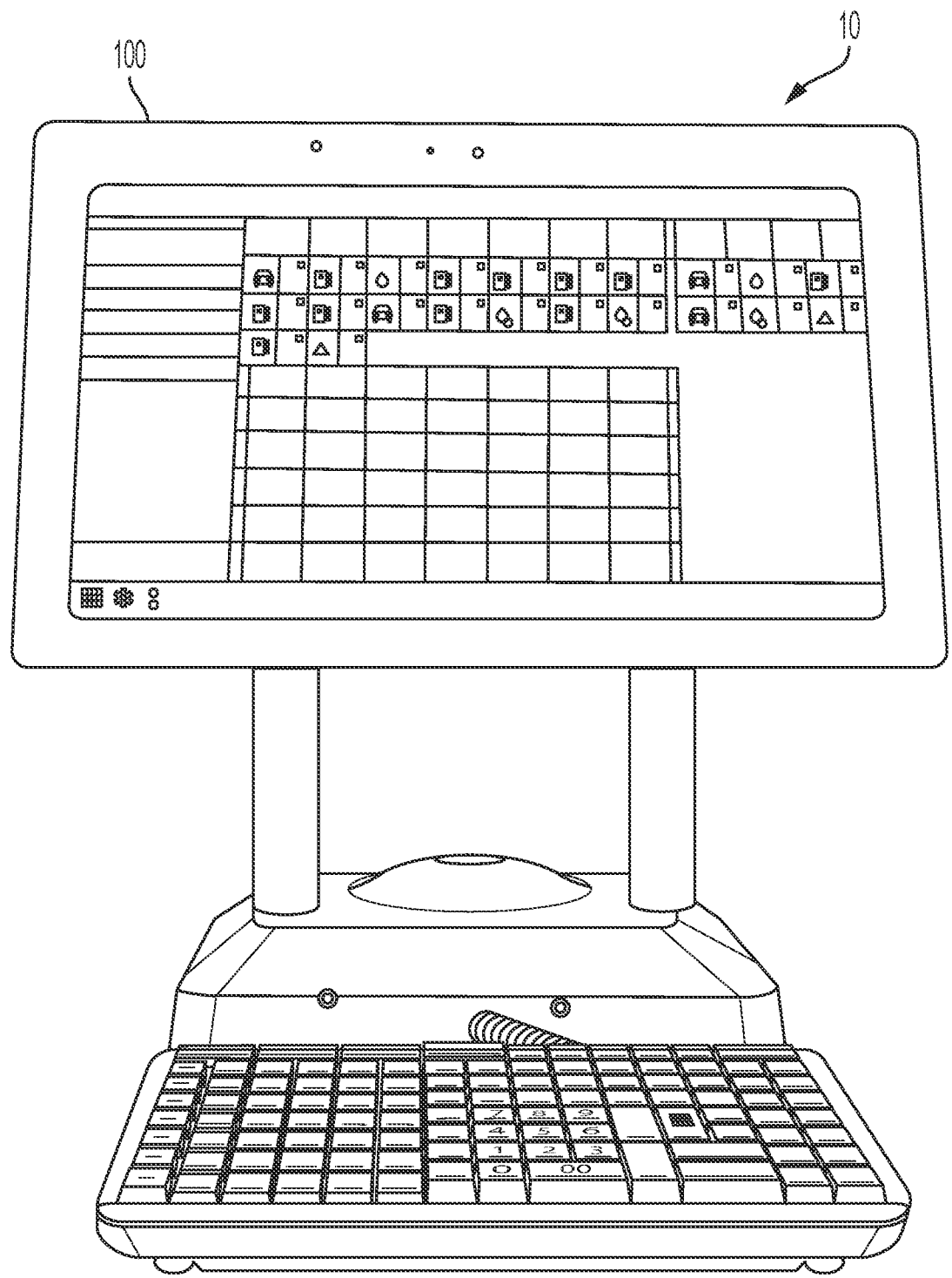
FIG. 1 is a front view of a point-of-sale device, in accordance with an example.

The present application is directed to a configurable point-of-sale device. The point-of-sale device includes an adjustable screen, an accelerometer, and a processor. The accelerometer provides the processor with orientation data regarding the adjustable screen. The processor analyzes the orientation data to determine the position (such as cashier position or customer position) and/or orientation (such as landscape or portrait) of the adjustable screen, and if the position and/or orientation has changed. If the position and/or orientation has changed, the processor then launches an application, such as a point-of-sale application or the self-checkout application, based on the position of the adjustable screen, the orientation of the adjustable screen, and/or one or more additional factors. Thus, a cashier may quickly and easily configure the point-of-sale device to run a point-of-sale application or self-checkout application by simply moving the adjustable screen.

When a cashier begins operating the point-of-sale device in the cashier position, the adjustable screen provides them with the ability to select an application to run, such as the point-of-sale application or the self-checkout application, or to "close the lane" by selecting an appropriate icon. If the cashier selects the point-of-sale application, the processor launches the point-of-sale application. The cashier may be required to enter credentials to access the point-of-sale application.

The cashier may then decide to flip the adjustable screen into the customer position. The cashier may choose to flip the adjustable screen to convert their station into a self-checkout station, if, for instance, they are going on break. The accelerometer generates orientation data corresponding to this change in position, and transmits the orientation data to a processor running an accelerometer driver and an application selector. The accelerometer driver analyzes the orientation data to determine the adjustable screen position, as well as a position change notification if the position of the screen has changed. If the adjustable screen position has changed, the application selector launches an application based on the adjustable screen position. In this case, the application selector will launch a self-checkout application, as the adjustable screen is in customer position.

When the cashier returns from their break, they may flip the adjustable screen back to the cashier position. The accelerometer provides updated orientation data to the accelerometer driver. The accelerometer driver generates a second position change notification, and determines the adjustable screen is now in cashier position. The application selector may then launch a point-of-sale application. Alternatively, the processor may generate an application selection window, allowing the cashier to launch either the point-of-sale application or the self-checkout application by selecting an appropriate icon.

In a further example, the point-of-sale device is configured to launch or configure applications based on the orientation, such as landscape or portrait, of the adjustable screen. In this example, the accelerometer driver analyzes the orientation data to determine the adjustable screen orientation, as well as an orientation change notification if the orientation of the screen has changed. If the adjustable screen orientation has changed, the application selector may launch an application based on the adjustable screen orientation. The launched application may be further based on the adjustable screen position. Further, rather than launch a new application, the processor may configure the display of the current application based on the adjustable screen orientation.

In a further example, the processor may determine an idle status of the point-of-sale device. In this example, the application selector only launches an application if the point-of-sale device has been idle for a pre-determined period of time, such as sixty seconds. In this way, the processor prevents a new application from being launched during the middle of a transaction or other operation.

In a further example, the adjustable screen may display a transition screen for a delay period prior to the launch of an application. For example, if the adjustable screen is flipped from cashier to customer position, the transition screen may be displayed for sixty seconds prior to the launch of the self-checkout application. The transition screen may include a selectable button to cancel the launch of the self-checkout application. Following the sixty second delay period, the application selector may launch the appropriate application.

FIG. 1 shows a front view of an example point-of-sale device 10. The point-of-sale device 10 can be any device which allows a cashier or customer to execute payment for goods or services. In the example of a retail shop, the point-of-sale device 10 is configured to total the cost of the goods the customer wishes to purchase, and determines an amount due based the on this total, as well as taxes, discounts, and other considerations. In one non-limiting example, the point-of-sale device 10 is a model C18™ sold by Verifone®. In order to facilitate the transaction, the point-of-sale device 10 may include one or more peripherals, such as a keyboard, mouse, bar code scanner, printer, pole display, coin dispenser, card reader, etc. These peripherals allow the cashier or customer to input information regarding the transaction to the point-of-sale device 10. In a further example, the point-of-sale device 10 may be connected to a back-end transaction system via a wired or wireless connection.

Figure 2A:
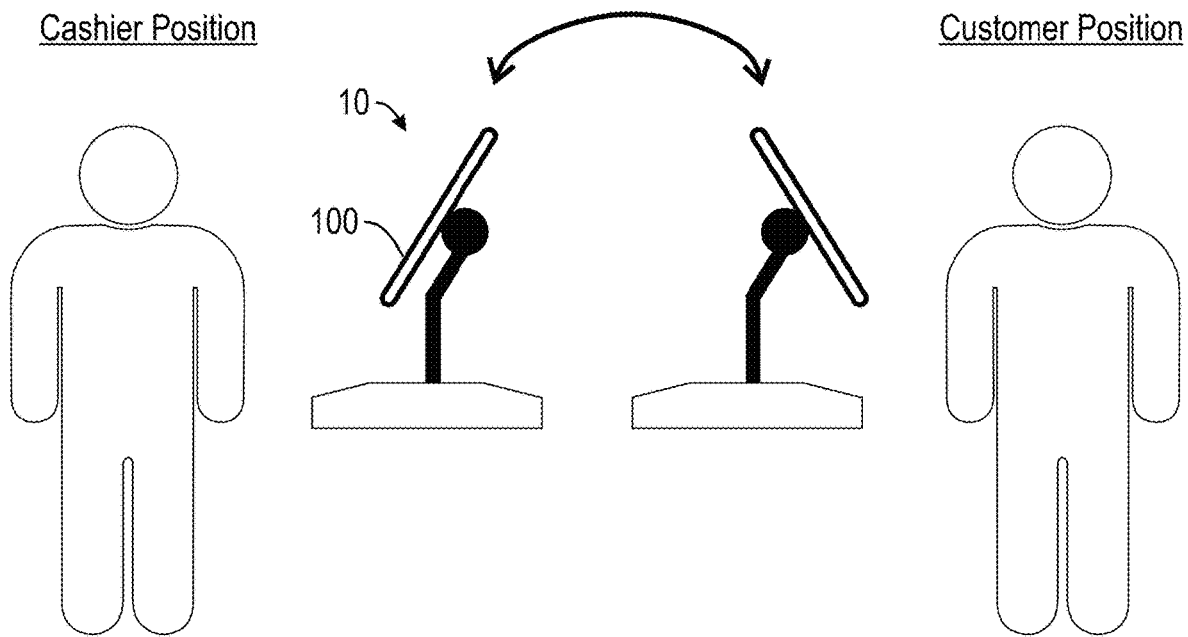
FIG. 2A is an illustration of an adjustable screen changing position, in accordance with an example.
Figure 2B:
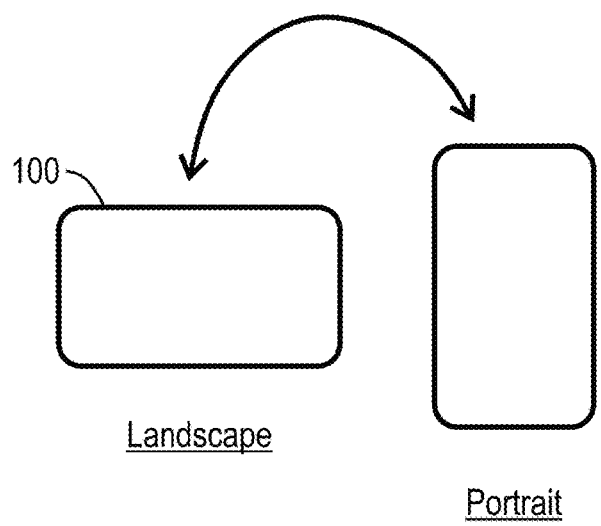
FIG. 2B is an illustration of an adjustable screen changing orientation, in accordance with an example.

The point-of-sale device 10 of FIG. 1 includes an adjustable screen 100. In some examples, the adjustable screen 100 can be a touch screen. As demonstrated in FIGS. 2A and 2B, the adjustable screen 100 may be manipulated in at least two ways. First, as shown in FIG. 2A, the adjustable screen 100 may be "flipped" between "cashier position" and "customer position." The cashier position may be any position in which a cashier would typically operate the point-of-sale device 10. For example, if the point-of-sale device 10 includes an embedded keyboard, the cashier position may correspond to the keyboard-side of the point-of-sale device 10. In one example, the point-of-sale device 10 may be arranged in a checkout lane of the aforementioned retail shop. In the cashier position, the adjustable screen 100 faces the area where the cashier typically stands during the transaction, such as behind a counter. In the customer position, adjustable screen 100 faces the area where customer typically stands. Thus, in this typical checkout lane configuration, a customer would not be permitted to access the area where the cashier stands, and would therefore be unable to view the adjustable screen 100 in cashier position. In a further example, the point-of-sale device 10 may be placed in the middle of an open format checkout area. In such a checkout area, a customer may be permitted to view the adjustable screen 100 in both cashier position or customer position. As shown in FIG. 2B, the adjustable screen 100 may be rotated into landscape orientation or portrait orientation.

Figure 3:
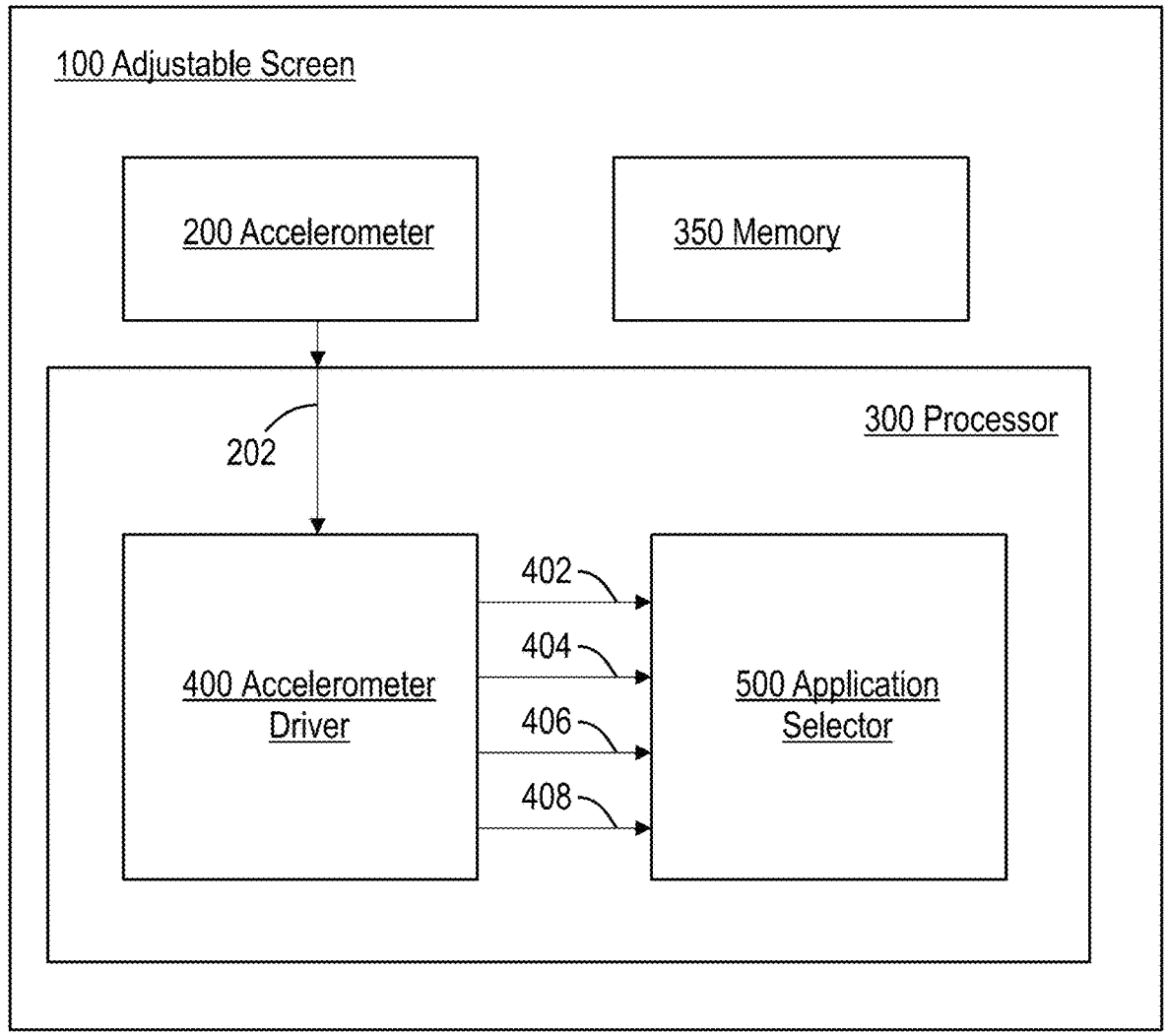
FIG. 3 is a block diagram of aspects of an adjustable screen, in accordance with an example.

FIG. 3 is a block diagram of aspects of the adjustable screen 100. As shown in FIG. 3, the adjustable screen 100 includes an accelerometer 200, a processor 300, and a memory 350, among other aspects. The processor 300 is configured to execute an accelerometer driver 400 and an application selector 500. Broadly, an accelerometer 200 is embedded within the adjustable screen 100. Thus, the accelerometer 200 moves with the adjustable screen 100, and generates orientation data 202 corresponding to the movement.

The orientation data 202 generated by the accelerometer 200 is provided to the accelerometer driver 400 run by the processor 300. The orientation data 202 may be retrieved from the accelerometer 200 at regular time intervals. The accelerometer driver 400 analyzes the orientation data 202 and determines the adjustable screen position 402 of the adjustable screen 100, such as cashier position or customer position. Further, the accelerometer driver 400 also generates a position change notification 404 if the position of the adjustable screen 100 has changed since the prior analysis of the orientation data 202.

Figure 13:
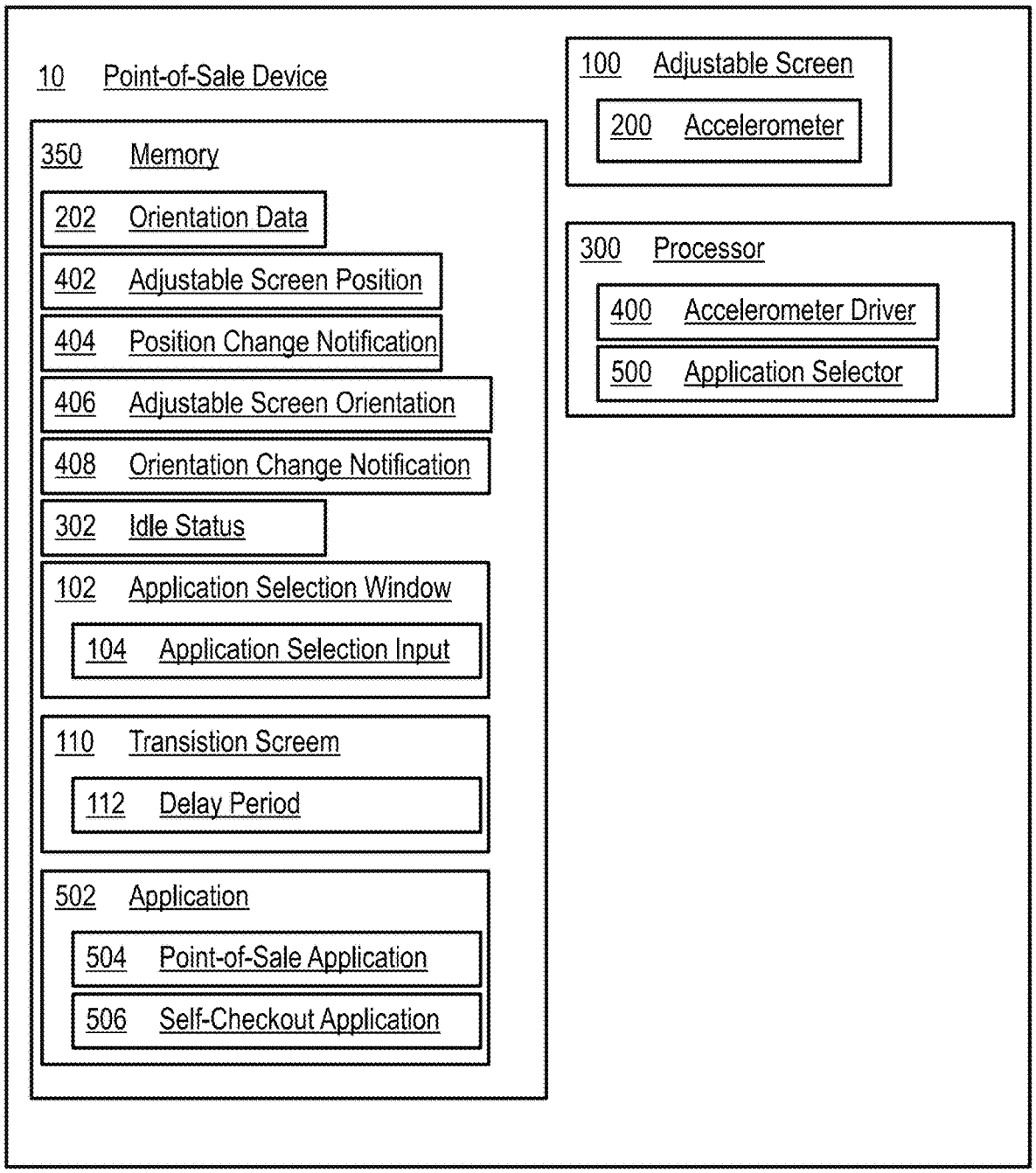
FIG. 13 is a schematic drawing of a point-of-sale device, in accordance with an example.

The application selector 500 then uses the position change notification 404 and the determined adjustable screen position 402 to launch an application 502 (see FIG. 13). In one example, if the application selector 500 receives the position change notification 404 (indicating the adjustable screen 100 has been flipped), the application selector 500 launches an application 502 based on the new adjustable screen position 402. If the adjustable screen position 402 is cashier position, the application selector 500 launches a point-of-sale application 506. In further examples, additional applications 502 may be available to be launched, such as, for example, a kiosk application, a loyalty program application, and/or a customer assistance application.

In the additional examples provided below, the application selector 500 may receive additional inputs to determine if an application 502 should be launched, and if so, which application 502 should be launched. For example, if the adjustable screen 100 is in cashier position, the application selection window 102 may be displayed allowing the cashier to choose to run the point-of-sale application 502 or the self-checkout application 504. This choice may be especially useful if the point-of-sale device 10 is positioned in the middle of an open format checkout area.

In a further example, the application selector 500 may only launch an application 502 if the processor 300 determines the point-of-sale device 10 to be in an idle state. In an even further example, the launch of the application 502 may be delayed by a delay period 112, or cancelled using a selectable cancel button 114. These examples will be described in greater detail below.

In a further example, the accelerometer driver 400 analyzes the orientation data 202 and determines the adjustable screen orientation 406 of the adjustable screen 100, such as landscape orientation or portrait orientation. Further, the accelerometer driver 400 also generates an orientation change notification 408 if the position of the adjustable screen 100 has changed since the prior analysis of the orientation data 202. The application selector 500 may then launch an application 502 based on the adjustable screen orientation 406. Alternatively, the application selector 500 may configure the appear and/or layout of an active application 500 based on the adjustable screen orientation 406.

Further, some or all of the information generated by the accelerometer 200 or the various aspects of the processor 300 may be stored in the memory 350. In another example, aspects of the processor 300 and/or the memory 350 may be arranged within other aspects of the point-of-sale device 10 other than the adjustable screen 100 itself.

Figure 4:
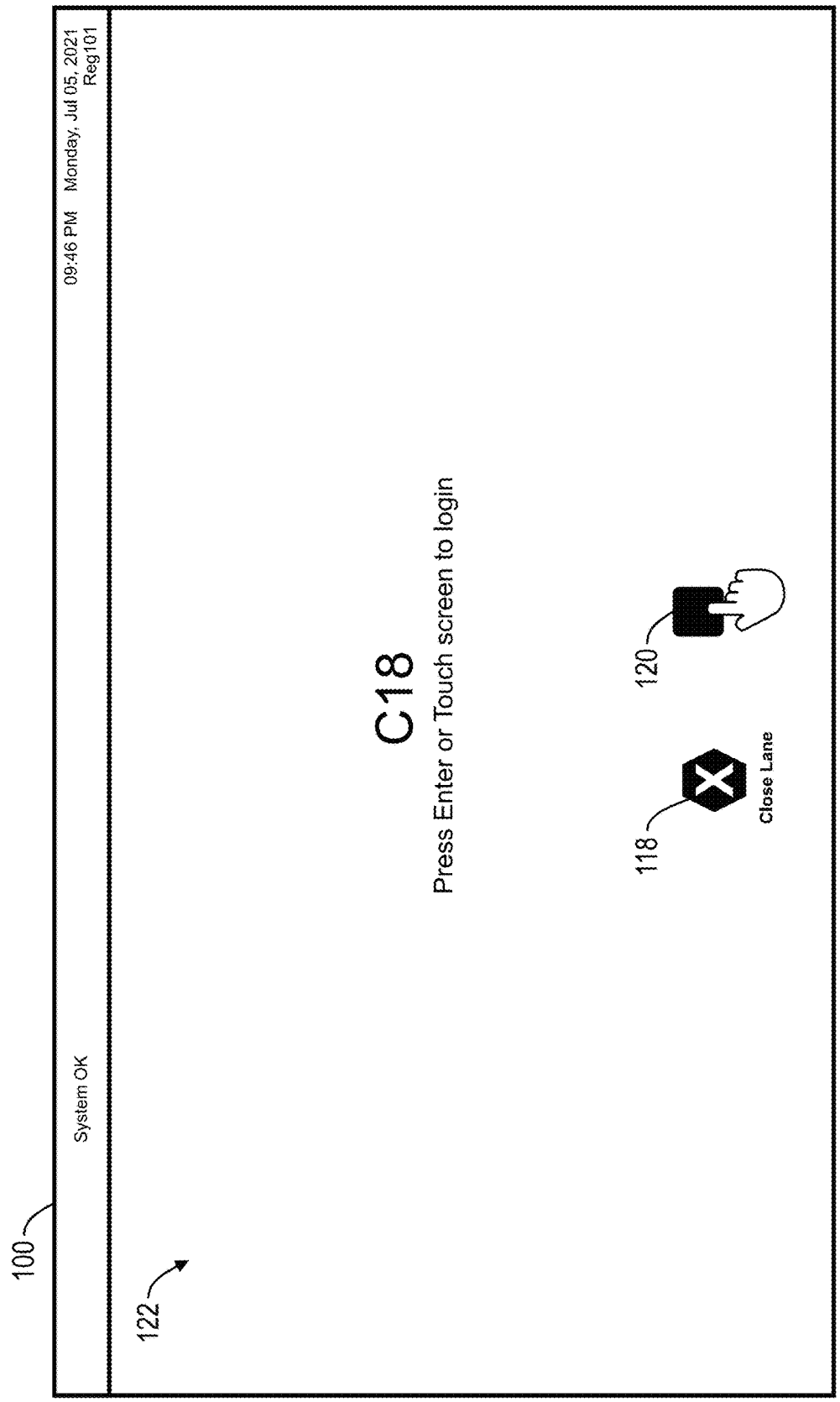
FIG. 4 is an illustration of a home screen as displayed on an adjustable screen of a point-of-sale device, in accordance with an example.

FIG. 4 is an illustration of a home screen 122 as displayed on an adjustable screen 100 of a point-of-sale device 10 in the cashier position. The home screen 122 is displayed when a cashier powers up a point-of-sale device 10. As can be seen in FIG. 4, the cashier has the option to select the close lane button 118 or the application selection button 120. By selecting the close lane button 118, the cashier may effectively disable functionality of the point-of-sale device 10.

Figure 5:
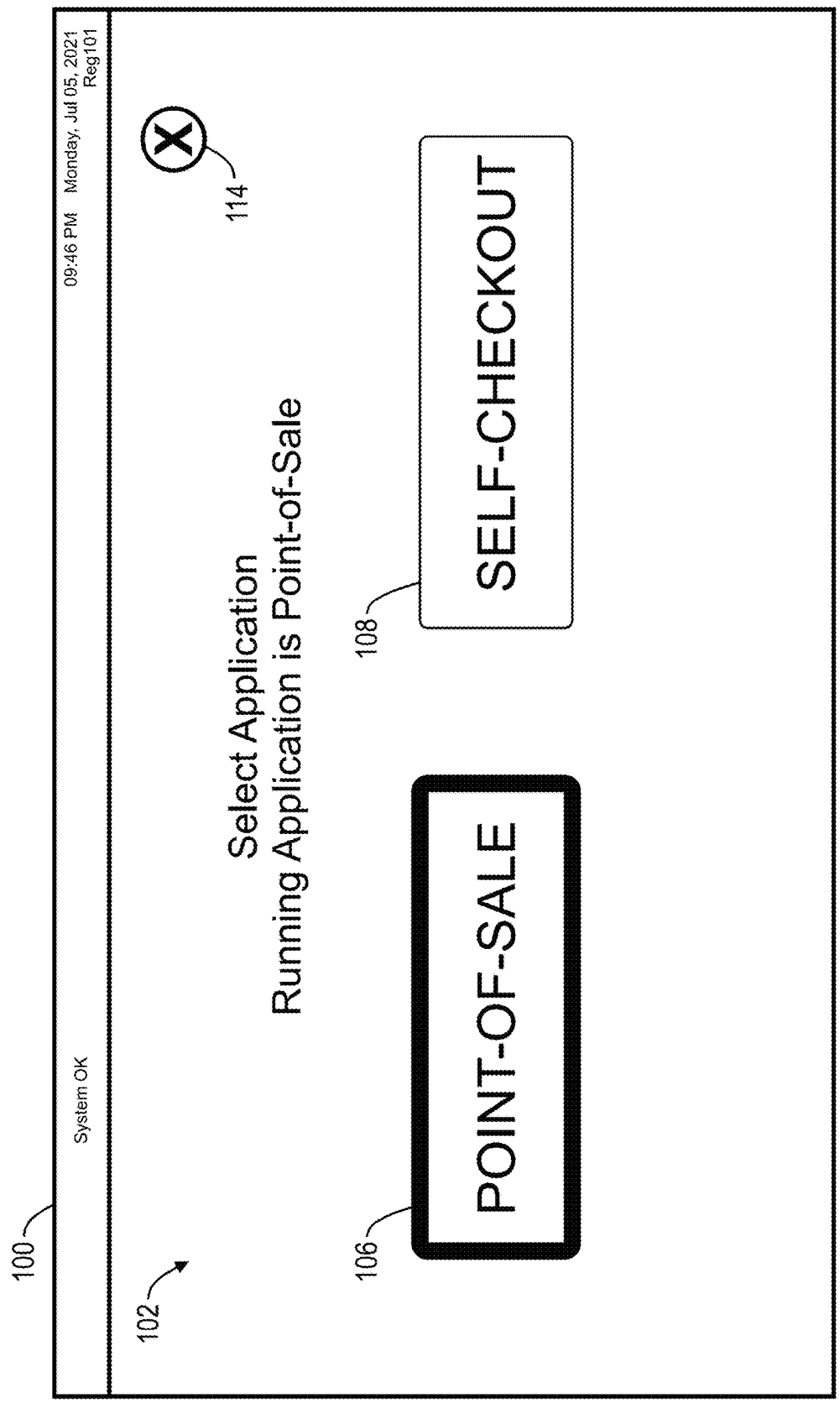
FIG. 5 is an illustration of an application selection window as displayed on an adjustable screen of a point-of-sale device, in accordance with an example.

FIG. 5 is an illustration of an application selection window 102 as displayed on an adjustable screen 100 of a point-of-sale device 10. From the application selection window 102, a user may enter an application selection input 104 by selecting either the selectable point-of-sale button 106 or the selectable self-checkout button 108. Choosing one of these buttons launches the corresponding application 502. Alternatively, the selectable cancel button 114 may be chosen to end the application selection process and return to the home screen 122 or the application 502 currently running.

Figure 6:
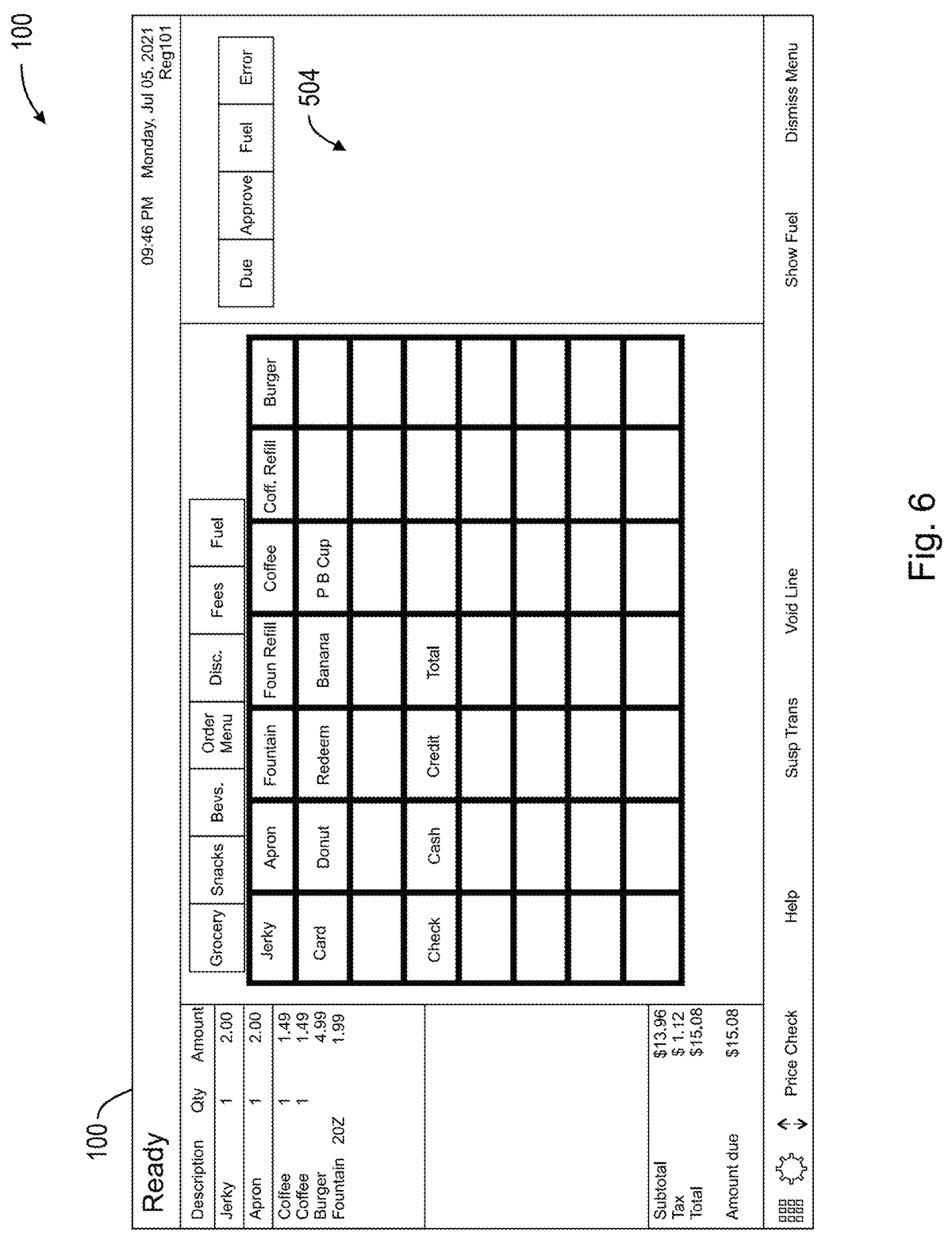
Figure 7:
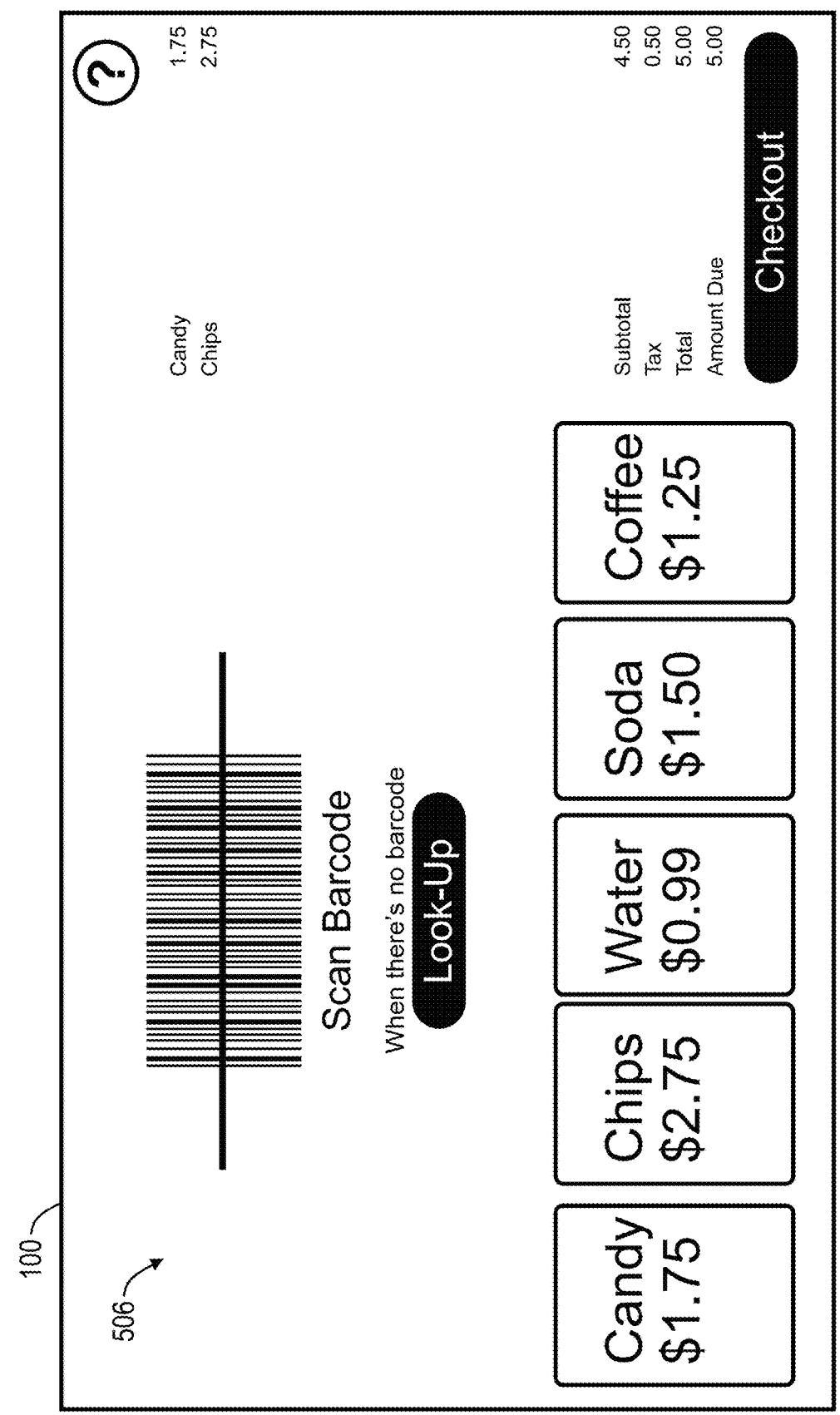
FIG. 7 is an illustration of a self-checkout application as displayed on an adjustable screen of a point-of-sale device, in accordance with an example.

The application selection window 102 may be displayed under a couple of different scenarios. First, the application selection window 102 may be display by selecting the application selection button 120 of FIG. 4. Alternatively, the application selection window 102 may be displayed by flipping the adjustable screen 100 from customer position to cashier position. In cashier position, the cashier may decide which application 500 to select. If the selectable point-of-sale button 106 is chosen, the point-of-sale application 504 shown in FIG. 6 is launched. If the selectable self-checkout button 108 is chosen, the self-checkout application 506 shown in FIG. 7 is launched. The launch of either application 500 may require the cashier to enter credentials, such as a password, a personal identification number (PIN), or an employee number.

Figure 8:
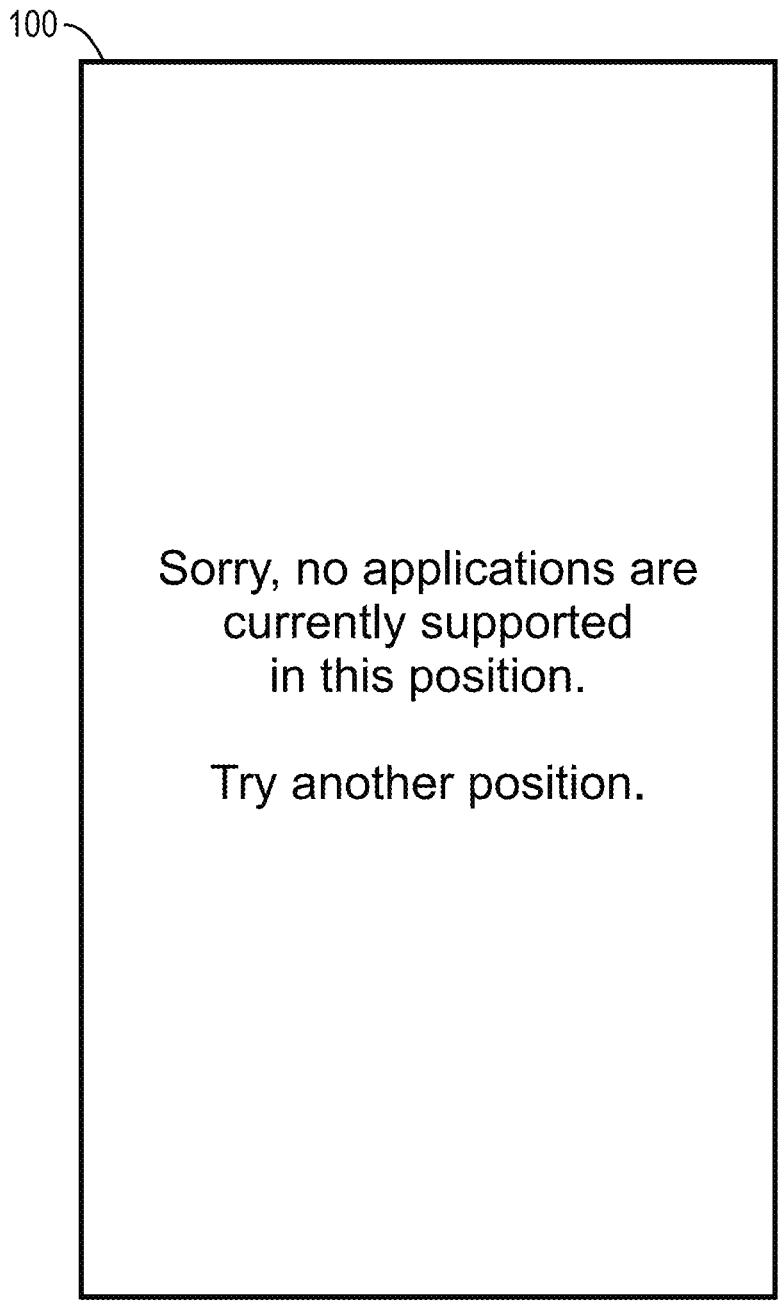
FIG. 8 is an illustration of portrait orientation as displayed on an adjustable screen of a point-of-sale device, in accordance with an example.

FIG. 8 shows the result of rotating the adjustable display screen 100 into portrait orientation. However, in this example, the application selector 500 does not have an application 500 configured to run in portrait orientation. Accordingly, the "Sorry, no applications are currently support in this position. Try another position." message is displayed. In further examples, the application selector 500 may launch a kiosk application, a loyalty program application, or a customer help application in portrait orientation.

Figure 9:
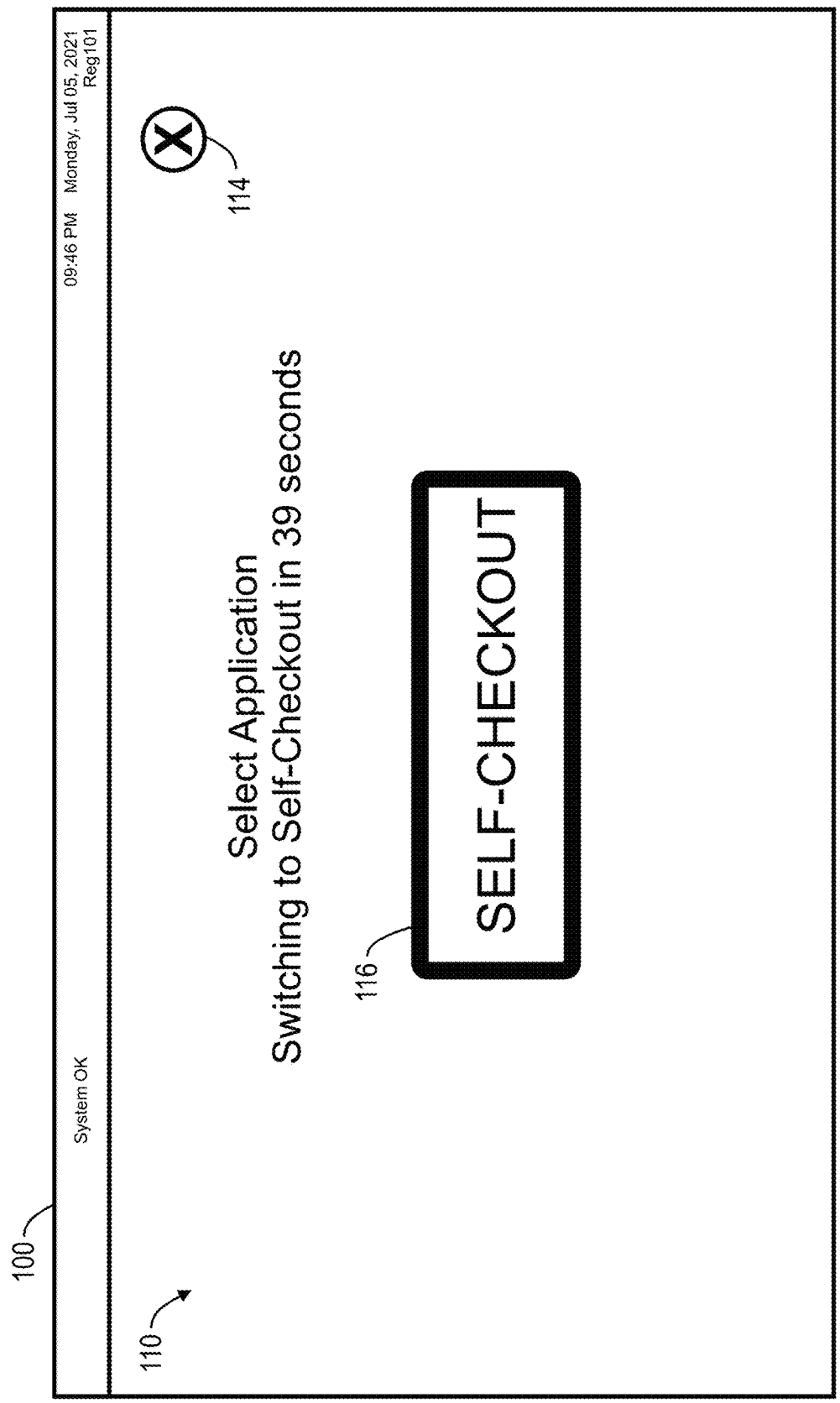
FIG. 9 is an illustration of a transition screen as displayed on an adjustable screen of a point-of-sale device, in accordance with an example.

FIG. 9 is an illustration of an example of a transition screen 110 as displayed on an adjustable screen 100 of a point-of-sale device 10. In this example, adjustable screen 100 has been flipped from cashier position to customer position, prompting the application selector 500 to launch the self-checkout application 506. However, before the self-checkout application 506 is launched, a transition screen 110 is displayed on the adjustable screen 100. The transition screen 110 delays the launch of an application 502 by a delay period 112, such as sixty seconds, in case the cashier has accidently flipped the adjustable screen 100. As shown in FIG. 9, the transition screen 110 may show a countdown (currently at 39 seconds) until the selected application 500 is launched. The transition screen 110 may also include a selectable application launch button 116 configured to launch the selected application 502 upon selection before the expiration of the delay period 112.

Figure 10:
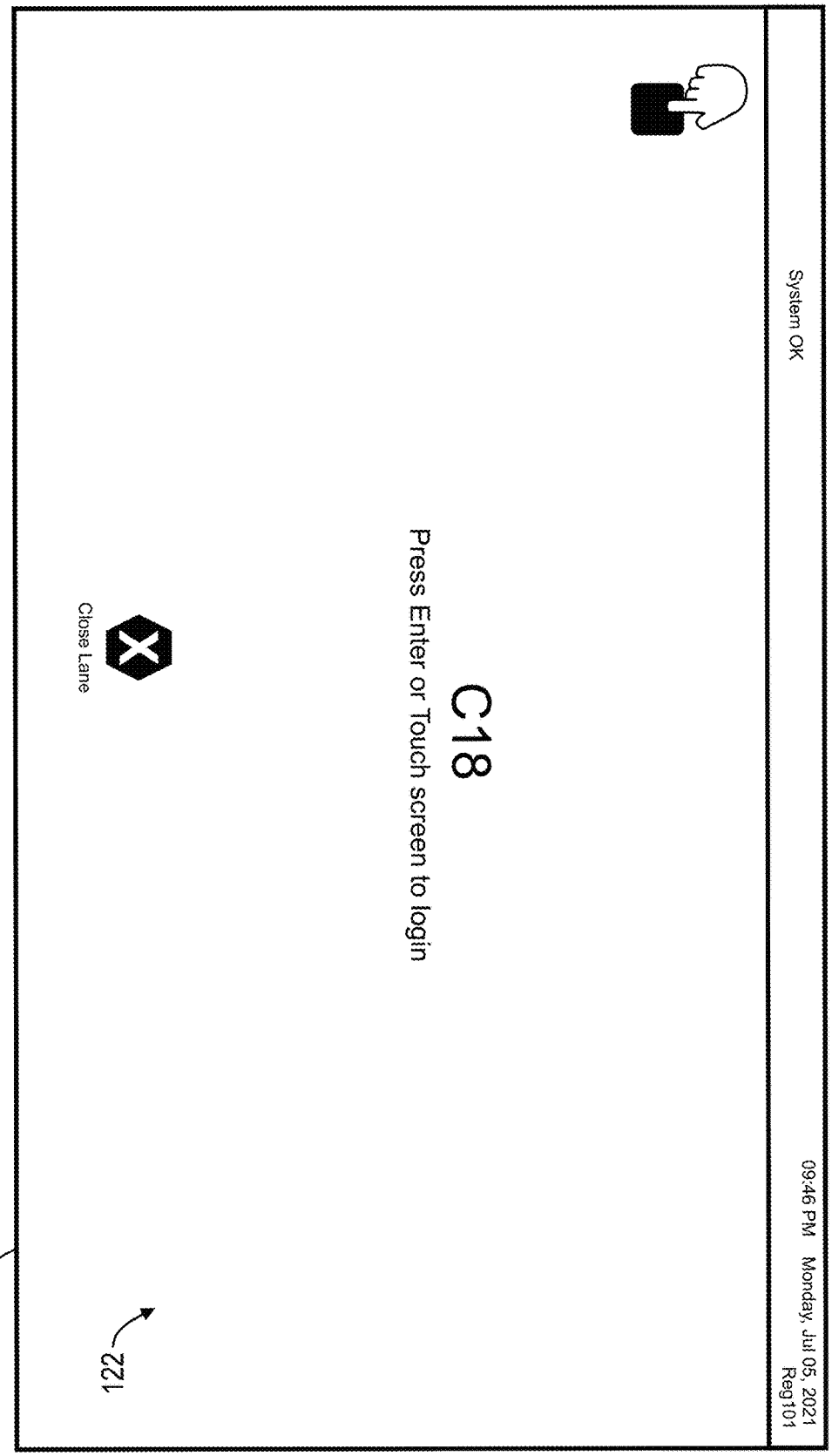
FIG. 10 is an illustration of an upside-down home screen as displayed on an adjustable screen of a point-of-sale device, in accordance with an example.

Further, the transition screen 110 may also include a selectable cancel button 114, interrupting the launch of the application 502. If the selectable cancel button 114 is selected following the adjustable screen 100 being flipped, the upside-down home screen 122 of FIG. 10 may be displayed, thus prompting the user to flip the adjustable screen to cashier position.

Figure 11:
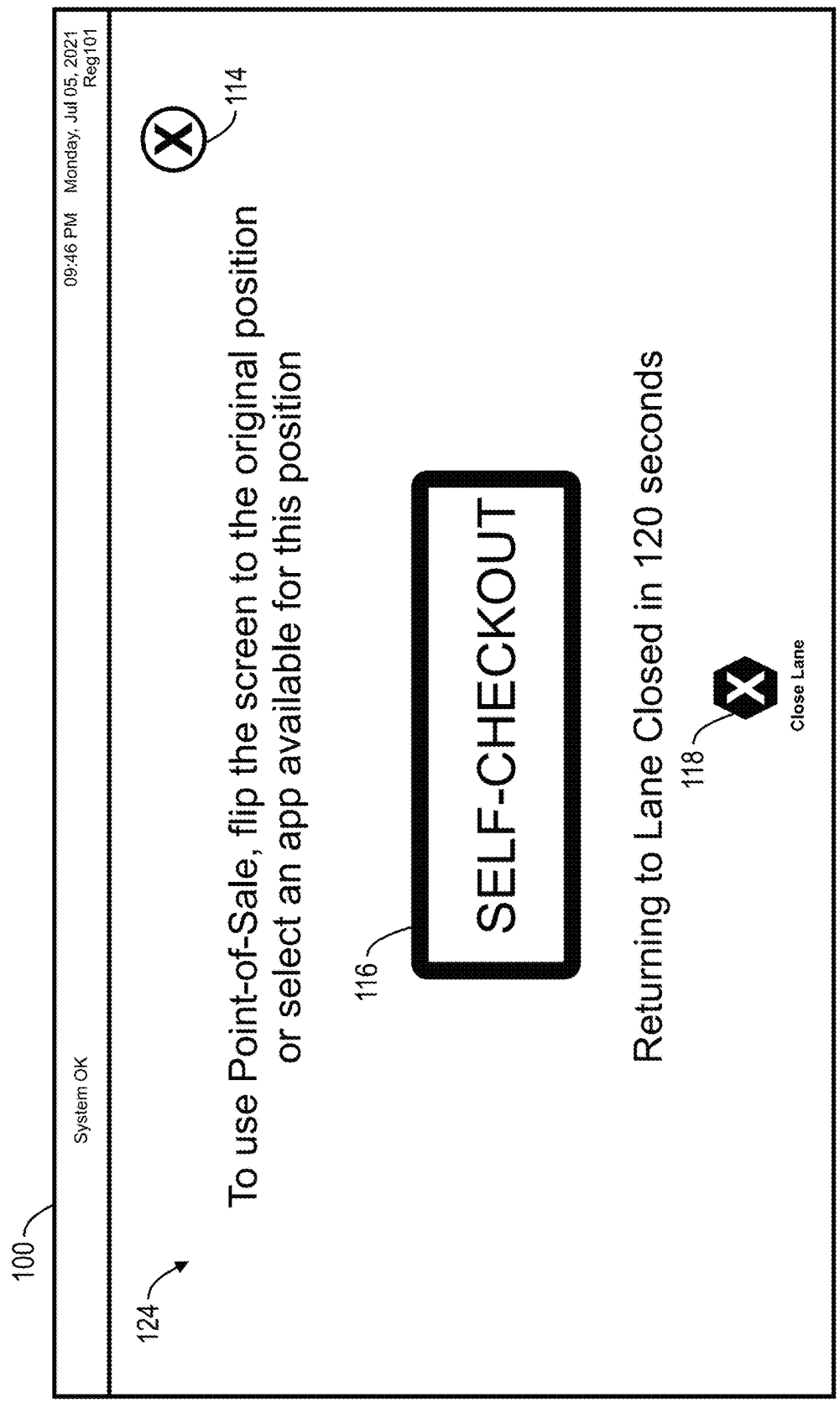
FIG. 11 is an illustration of a closed-lane-transition screen as displayed on an adjustable screen of a point-of-sale device, in accordance with an example.

FIG. 11 is an illustration of a closed-lane-transition screen 124 as displayed on an adjustable screen 100 of a point-of-sale device 10. In this example, a cashier has closed the lane running a point-of-sale application 504 in cashier position. The adjustable screen 100 is subsequently flipped into customer position, causing the closed lane-transition screen 124 to be displayed. If the user doesn't act during a close lane transition period, such as 120 seconds, the point-of-sale device 10 will return to closed lane mode. Further, the closed lane transition screen 124 informs a cashier to flip the screen to run the point-of-sale application 504. If the cashier wishes to run the self-checkout application 506, the cashier may select the selectable application launch button 116. If the selectable cancel button is selected 114, the upside-down home screen 12 of FIG. 10 will be displayed.

Figure 12:
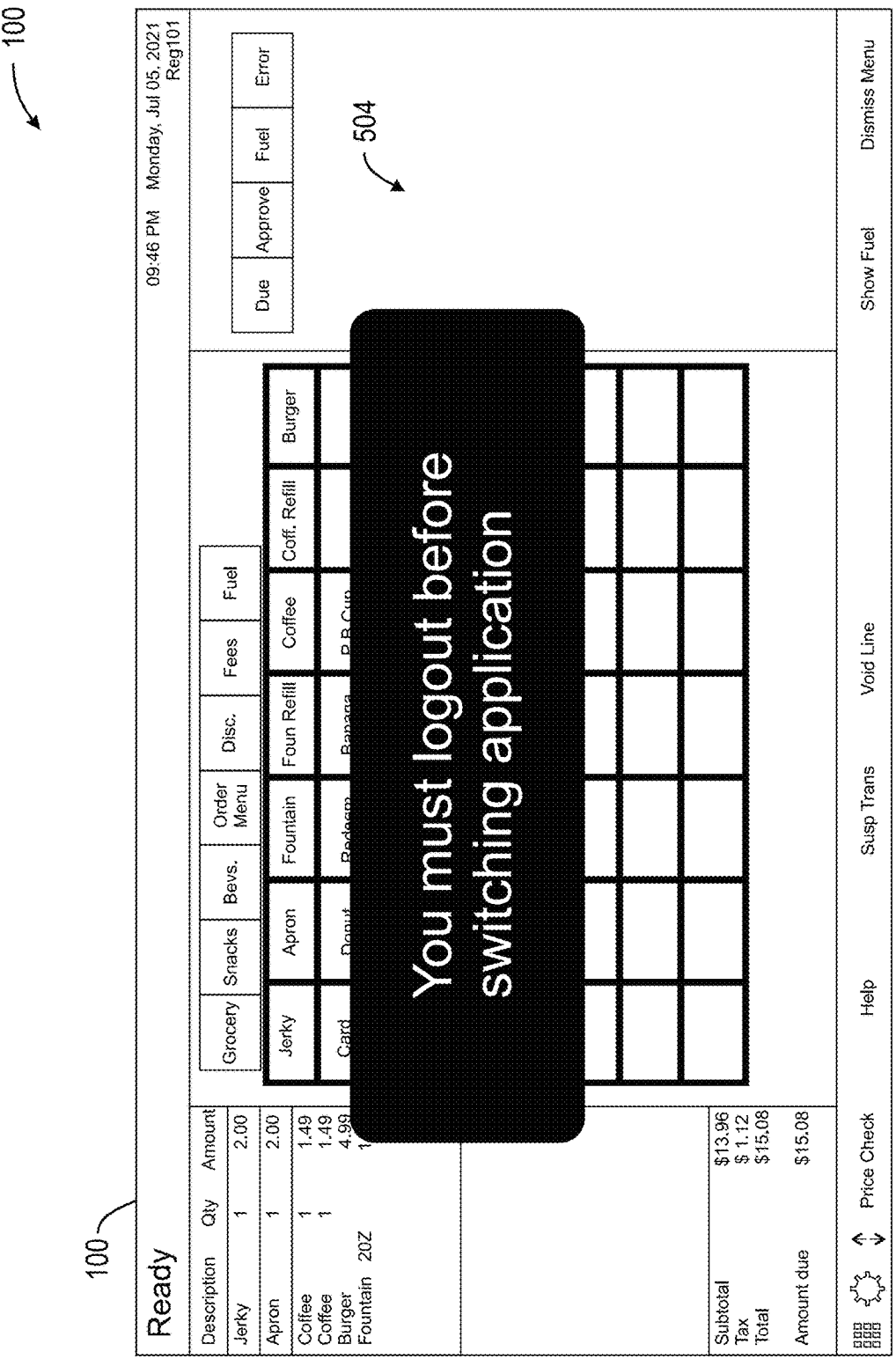
FIG. 12 is an illustration of a point-of-sale application as displayed on an adjustable screen of a point-of-sale device, in accordance with a further example.

FIG. 12 is an illustration of a point-of-sale application 502 as displayed on an adjustable screen 100 of a point-of-sale device 10. The cashier then flips the adjustable screen 100 to launch the self-checkout application 504. However, in this example, the application selector 500 will only switch applications 502 if the point-of-sale device is idle. The application selector 500 determines if the point-of-sale device 10 is idle based on an idle status 302. The idle status 302 may be set to "idle" if the cashier has logged out of the current application 502 and/or if the cashier has not interacted with the current application 502 for a pre-determine idle period, such as sixty seconds. If the idle status 302 is determined to be "not idle," the switching application 502 may be prevented and an explanatory text box may appear, as shown in FIG. 11. An application 502 launch may also be prevented if the point-of-sale device 10 is undergoing closing processes, or if point-of-sale device 10 is executing a software upgrade.

FIG. 13 is a schematic drawing of a point-of-sale device 10. As shown in FIG. 13, the point-of-sale device 10 includes an accelerometer 200 embedded within an adjustable screen 100, a processor 300, and a memory 350. The processor 300 is configured to execute the accelerometer driver 400 and the application selector 500 using data stored in memory 350. In some examples, the processor 300 and/or the memory 350 may be embedded within the adjustable screen 100. In other examples, the processor 300 and/or memory 350 may be arranged within other aspects of the point-of-sale device 10.

Figure 14:
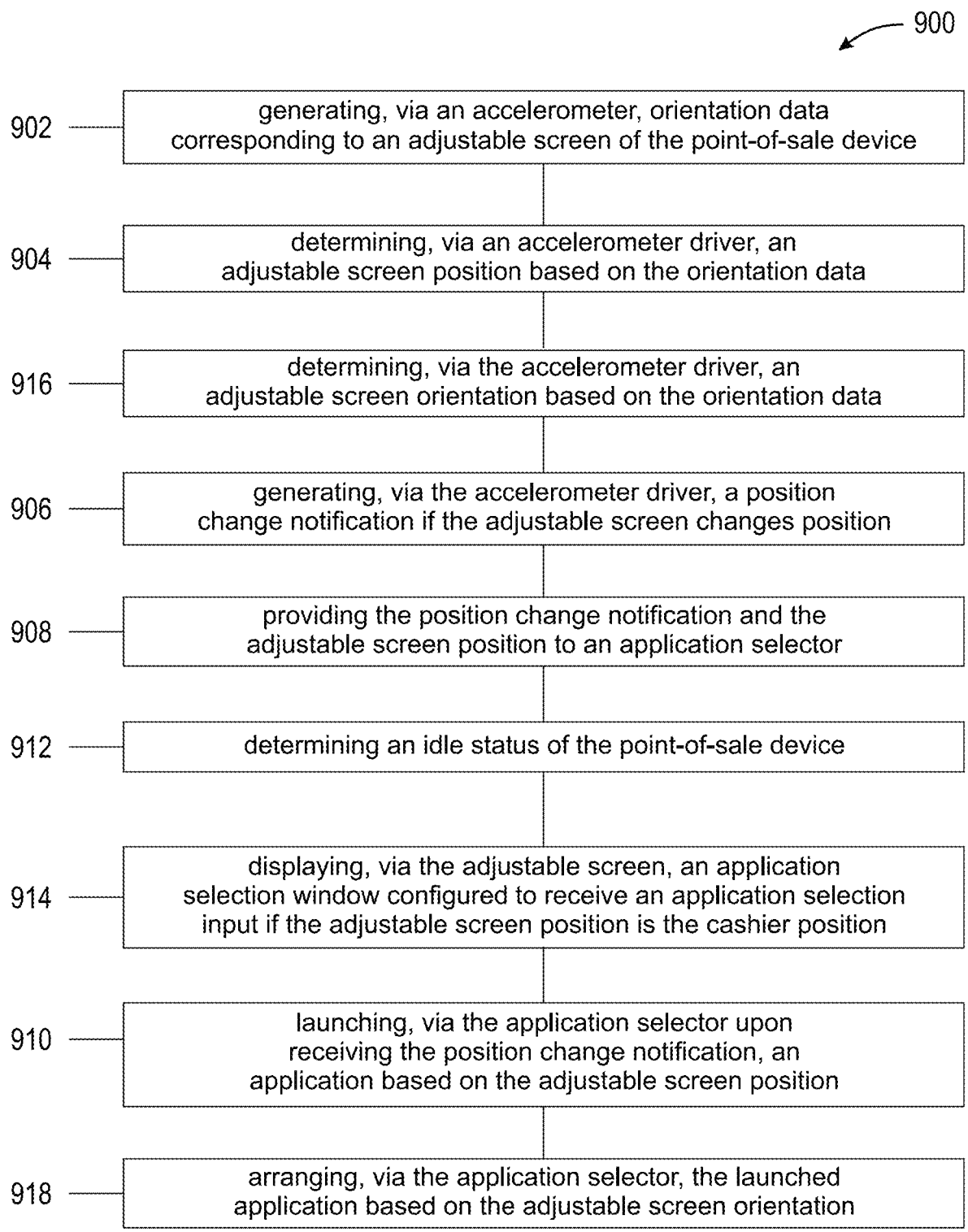
FIG. 14 is a flowchart of a method for self-checkout monitoring, in accordance with an example.

FIG. 14 is a flowchart depicting a method 900 for configuring a point-of-sale device is provided. As previously described, the point-of-sale device includes an adjustable screen. The adjustable screen is configured to be arranged in a cashier position or a customer position.

The method 900 includes generating 902, via an accelerometer, orientation data corresponding to an adjustable screen of the point-of-sale device. The method 900 further includes determining 904, via an accelerometer driver, an adjustable screen position based on the orientation data. The method 900 further includes generating 906, via the accelerometer driver, a position change notification if the adjustable screen changes position. The method 900 further includes providing 908 the position change notification and the adjustable screen position to an application selector. The method 900 further includes launching 910, via the application selector upon receiving the position change notification, an application based on the adjustable screen position. The application is a point-of-sale application or a self-checkout application.

According to an example, the method 900 includes determining 912 an idle status of the point-of-sale device. The launch of the application is further based on the idle status.

According to an example, the method 900 further includes displaying 914, via the adjustable screen, an application selection window configured to receive an application selection input if the adjustable screen position is the cashier position. The launch of the application is further based on the application selection input.

According to an example, the method 900 further includes determining 916, via the accelerometer driver, an adjustable screen orientation based on the orientation data. The orientation of the adjustable screen is landscape or portrait. The method 900 further includes arranging 918, via the application selector, the launched application based on the adjustable screen orientation.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A point-of-sale device, comprising:
   an adjustable screen configured to be arranged in a cashier position or a customer position;
   an accelerometer configured to generate orientation data corresponding to the adjustable screen;
   a processor configured to:
     receive, via the accelerometer, the orientation data;
     determine, via an accelerometer driver, an adjustable screen position based on the orientation data;
     generate, via the accelerometer driver, a position change notification if the adjustable screen changes position;
     provide the position change notification and the adjustable screen position to an application selector;
     determine an idle status of the point-of-sale device as idle if a pre-determined time period has elapsed since a user has interacted with a current application run by the point-of-sale device; and
     launch, via the application selector upon receiving the position change notification, an application based on the adjustable screen position, wherein the application is a point-of-sale application or a self-checkout application, and wherein the launch of the application is enabled only if the idle status is idle when the adjustable screen changes position.

2. The point-of-sale device of claim 1, wherein the launched application is the point-of-sale application if the adjustable screen position is the cashier position.

3. The point-of-sale device of claim 1, wherein the launched application is the self-checkout application if the adjustable screen position is the customer position.

4. The point-of-sale device of claim 1, wherein the processor is further configured to display, via the adjustable screen, an application selection window configured to receive an application selection input if the adjustable screen position is the cashier position.

5. The point-of-sale device of claim 4, wherein the launch of the application is further based on the application selection input, and wherein the application selection window comprises a selectable point-of-sale button and a selectable self-checkout button.

6. The point-of-sale device of claim 1, wherein the processor is further configured to determine an adjustable screen orientation based on the orientation data.

7. The point-of-sale device of claim 6, wherein the adjustable screen orientation is landscape or portrait, and wherein the processor is further configured to arrange the launched application based on the adjustable screen orientation.

8. The point-of-sale device of claim 1, wherein the processor is further configured to display a transition screen after the adjustable screen changes position and prior to launching the application.

9. The point-of-sale device of claim 8, wherein the transition screen is displayed for a delay period.

10. The point-of-sale device of claim 8, wherein the transition screen comprises a selectable cancel button configured to cancel the launch of the application upon selection.

11. The point-of-sale device of claim 8, wherein the transition screen comprises a selectable application launch button configured to launch the application upon selection.

12. The point-of-sale device of claim 1, wherein the idle status of the point-of-sale device is determined further based on a log-out status of the user.

13. A method for configuring a point-of-sale device comprising an adjustable screen configured to be arranged in a cashier position or a customer position, comprising:
   generating, via an accelerometer, orientation data corresponding to an adjustable screen of the point-of-sale device;
   determining, via an accelerometer driver, an adjustable screen position based on the orientation data;
   generating, via the accelerometer driver, a position change notification if the adjustable screen changes position;
   providing the position change notification and the adjustable screen position to an application selector;
   determining an idle status of the point-of-sale device as idle if a pre-determined time period has elapsed since a user has interacted with a current application run by the point-of-sale device; and
   launching, via the application selector upon receiving the position change notification, an application based on the adjustable screen position, wherein the application is a point-of-sale application or a self-checkout application, and wherein the launch of the application is enabled only if the idle status is idle when the adjustable screen changes position.

14. The method of claim 13, further comprising displaying, via the adjustable screen, an application selection window configured to receive an application selection input if the adjustable screen position is the cashier position, wherein the launch of the application is further based on the application selection input.

15. The method of claim 13, further comprising:
   determining, via the accelerometer driver, an adjustable screen orientation based on the orientation data, wherein the orientation of the adjustable screen is landscape or portrait; and
   arranging, via the application selector, the launched application based on the adjustable screen orientation.

16. The method of claim 13, wherein the idle status of the point-of-sale device is determined further based on a log-out status of the user.

17. The method of claim 13, further comprising displaying a transition screen after the adjustable screen changes position and prior to launching the application.

18. A point-of-sale device, comprising:

an adjustable screen configured to be arranged in landscape orientation or portrait orientation;

an accelerometer configured to generate orientation data corresponding to the adjustable screen; and a processor configured to:

receive, via the accelerometer, the orientation data;

determine, via an accelerometer driver, an adjustable screen orientation based on the orientation data;

generate, via the accelerometer driver, an orientation change notification if the adjustable screen changes orientation;

provide the orientation change notification and the adjustable screen orientation to an application selector;

determine an idle status of the point-of-sale device as idle if a pre-determined time period has elapsed since a user has interacted with a current application run by the point-of-sale device; and launch, via the application selector upon receiving the orientation change notification, an application based on the adjustable screen orientation, wherein the application is a point-of-sale application or a self-checkout application, and wherein the launch of the application is enabled only if the idle status is idle when the adjustable screen changes position.

19. The point-of-sale device of claim 18, wherein the idle status of the point-of-sale device is determined further based on a log-out status of the user.

20. The point-of-sale device of claim 18, wherein the processor is further configured to display a transition screen after the adjustable screen changes orientation and prior to launching the application.

\* \* \* \* \*